US012803089B2

(12) United States Patent
Jeong et al.

(10) Patent No.: US 12,803,089 B2
(45) Date of Patent: Nov. 17, 2026

(54) POUCH CASE AND THE METHOD OF MANUFACTURING THE POUCH TYPE SECONDARY BATTERY INCLUDING THE SAME

(71) Applicant: LG Chem, Ltd., Seoul (KR)

(72) Inventors: Ansoo Jeong, Daejeon (KR); Sang Uck Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 1213 days.

(21) Appl. No.: 17/263,328

(22) PCT Filed: Nov. 13, 2019

(86) PCT No.: PCT/KR2019/015456
§ 371 (c)(1),
(2) Date: Jan. 26, 2021

(87) PCT Pub. No.: WO2020/101353
PCT Pub. Date: May 22, 2020

(65) Prior Publication Data
US 2021/0143503 A1 May 13, 2021

(30) Foreign Application Priority Data
Nov. 13, 2018 (KR) ........................ 10-2018-0139104

(51) Int. Cl.
*H01M 50/184* (2021.01)
*B29C 65/02* (2006.01)
(Continued)

(52) U.S. Cl.
CPC ........... *H01M 50/184* (2021.01); *B29C 65/02* (2013.01); *H01M 50/105* (2021.01); *H01M 50/124* (2021.01); *B29L 2031/7146* (2013.01)

(58) Field of Classification Search
None
See application file for complete search history.

(56) References Cited

U.S. PATENT DOCUMENTS 6,451,476 B1 9/2002 Chang et al.
7,749,648 B2 7/2010 Kim
(Continued)

FOREIGN PATENT DOCUMENTS

CN 1767228 A 5/2006
JP 2001229889 A 8/2001
(Continued)

OTHER PUBLICATIONS

KR 101485783 B1 Translation from Espacenet (Year: 2015).*
(Continued)

*Primary Examiner* — Haroon S. Sheikh
(74) *Attorney, Agent, or Firm* — Lerner David LLP

(57) ABSTRACT

A method of manufacturing a pouch type secondary battery according to an exemplary embodiment of the present disclosure includes the steps of: accommodating an electrode assembly in a space between an upper case and a lower case; and thermally fusing edge parts of the upper case and the lower case to each other, wherein edge parts of the upper case and the lower case each include a substrate layer, a metal layer and a sealing layer that are sequentially stacked, and wherein before the step of thermally fusing, the method further includes forming a plurality of grooves on one surface of at least one sealing layer of each of the upper case and the lower case.

5 Claims, 4 Drawing Sheets

(51) Int. Cl.

| | |
|---|---|
| ***B29L 31/00*** | (2006.01) |
| ***H01M 50/105*** | (2021.01) |
| ***H01M 50/124*** | (2021.01) |

(56) References Cited

U.S. PATENT DOCUMENTS

| | | | | |
|---|---|---|---|---|
| 8,771,866 | B2 | 7/2014 | Yoon | |
| 2006/0000734 | A1* | 1/2006 | Ninomiya | B29C 66/346 206/438 |
| 2006/0093905 | A1 | 5/2006 | Kim | |
| 2011/0014516 | A1 | 1/2011 | Roh et al. | |
| 2012/0244420 | A1* | 9/2012 | Serizawa | H01M 50/367 29/623.3 |
| 2013/0071696 | A1 | 3/2013 | Kim et al. | |
| 2015/0044547 | A1 | 2/2015 | Lee et al. | |
| 2016/0079576 | A1 | 3/2016 | Lim et al. | |
| 2018/0047950 | A1 | 2/2018 | Lim et al. | |

FOREIGN PATENT DOCUMENTS

| | | | |
|---|---|---|---|
| JP | 2013211206 | A | 10/2013 |
| JP | 2015072803 | A | 4/2015 |
| JP | 2018147573 | A | 9/2018 |
| KR | 20060027264 | A | 3/2006 |
| KR | 20070091877 | A | 9/2007 |
| KR | 100956397 | B1 | 5/2010 |
| KR | 20110109824 | A | 10/2011 |
| KR | 101084081 | B1 | 11/2011 |
| KR | 101112450 | B1 | 2/2012 |
| KR | 20140013266 | A | 2/2014 |
| KR | 20140026158 | A | 3/2014 |
| KR | 20140031581 | A | 3/2014 |
| KR | 20150125263 | A | 11/2015 |
| KR | 20160118931 | A | 10/2016 |
| KR | 20160125818 | A | 11/2016 |
| WO | 2020101353 | A1 | 5/2020 |

OTHER PUBLICATIONS

KR 20070091877A Espacenet translation (Year: 2007).*

Search Report dated Jun. 29, 2022 from Office Action for Chinese Application No. 201980047164.0 issued Jul. 5, 2022. 4 pgs.

Supplementary European Search Report for Application No. 19884288.2 dated Jul. 27, 2021. 2 pgs.

International Search Report for Application No. PCT/KR2019/015456, dated Mar. 2, 2020, 2 pages.

* cited by examiner

【FIG. 1】
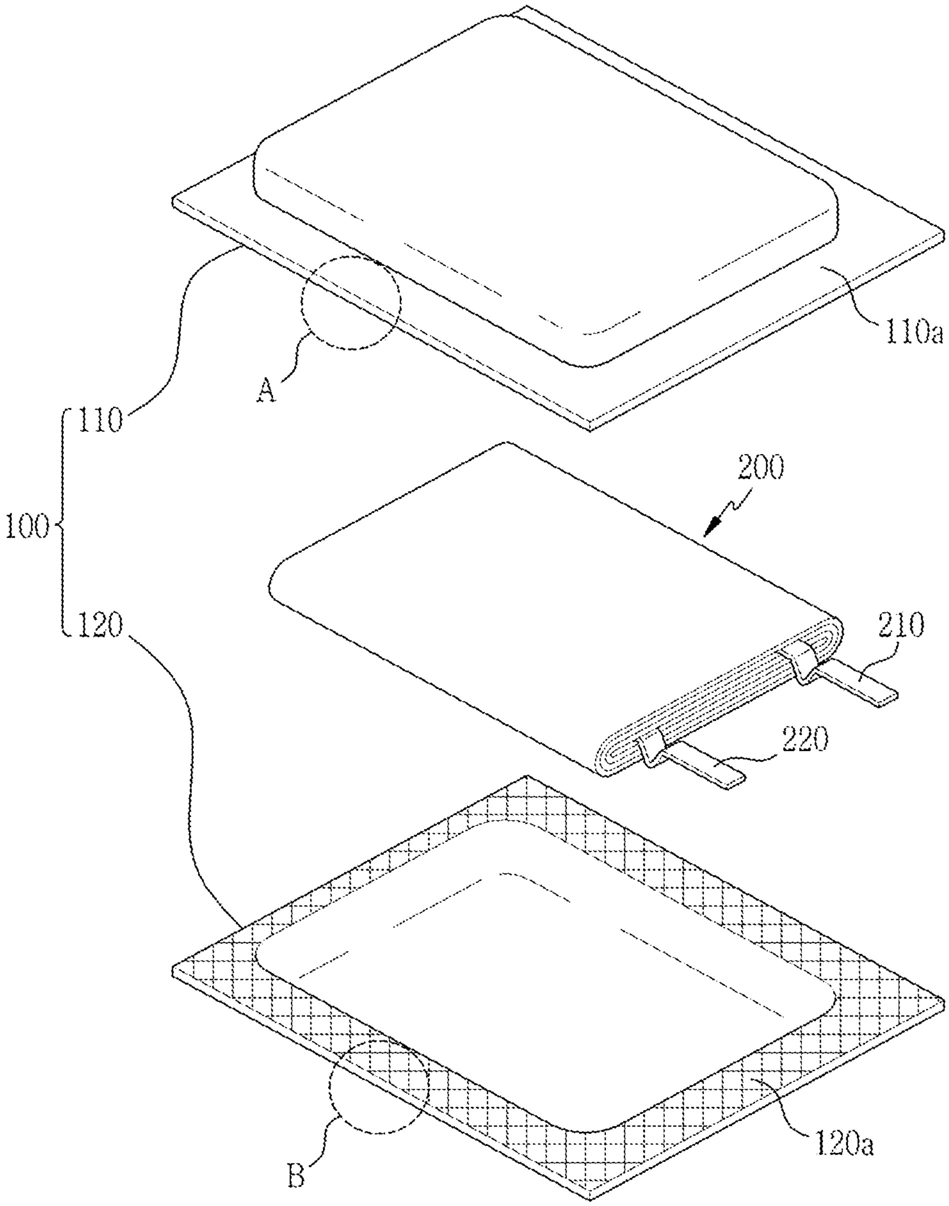

【FIG. 2】
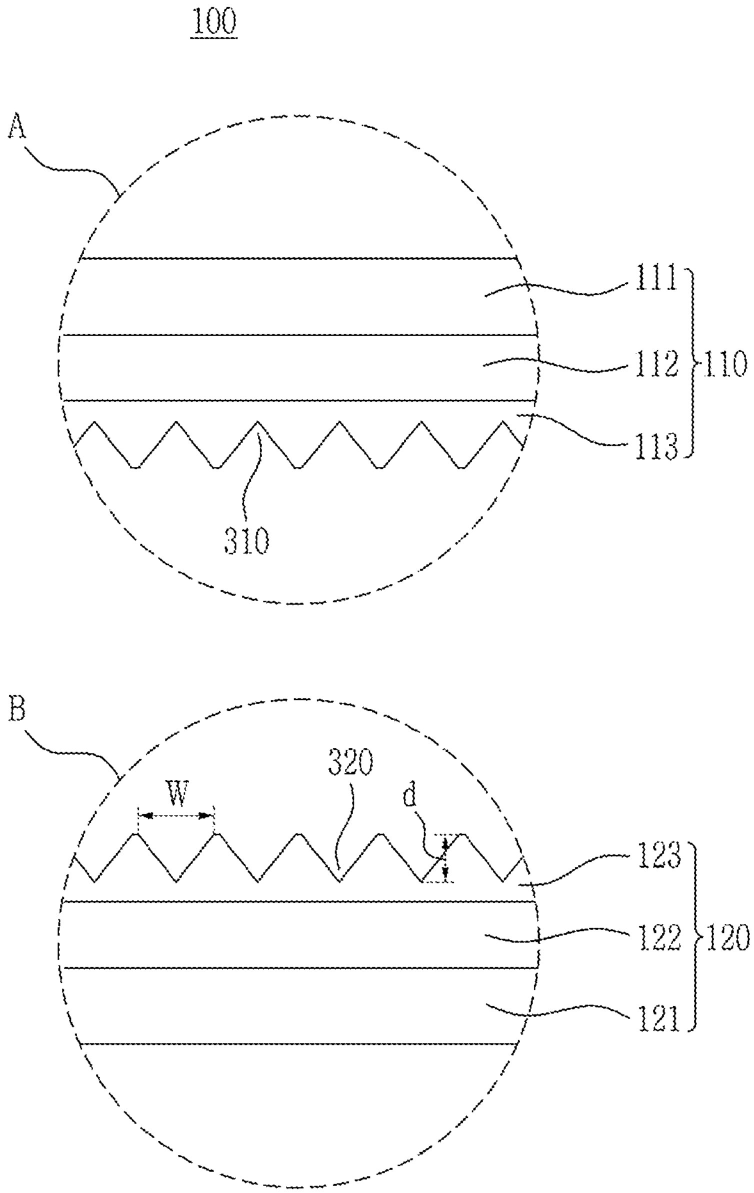

【FIG. 3】
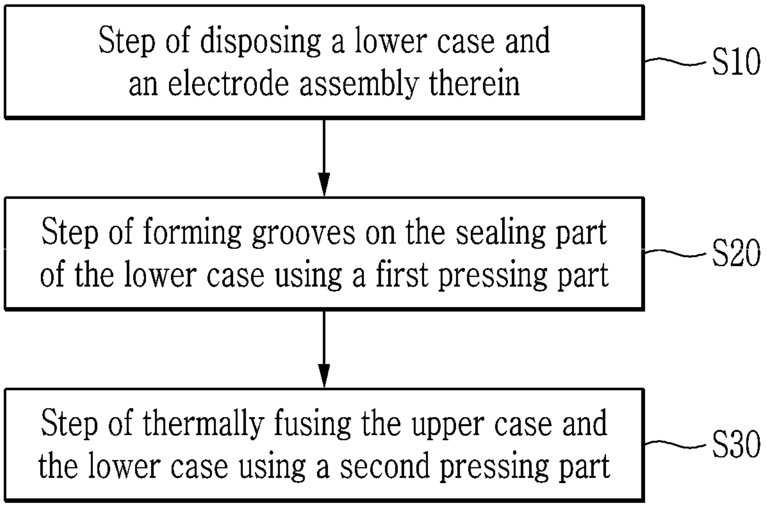
【FIG. 4a】
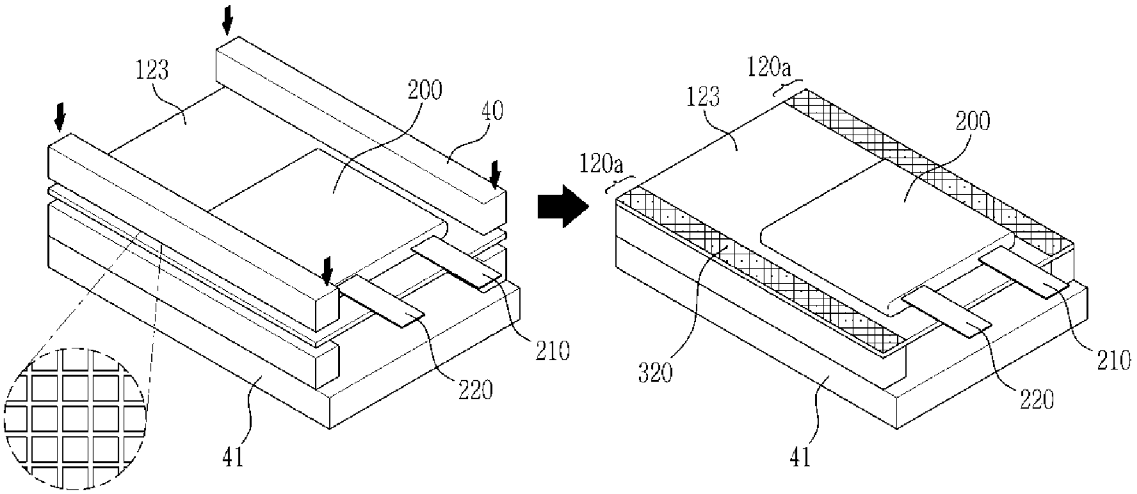

【FIG. 4b】
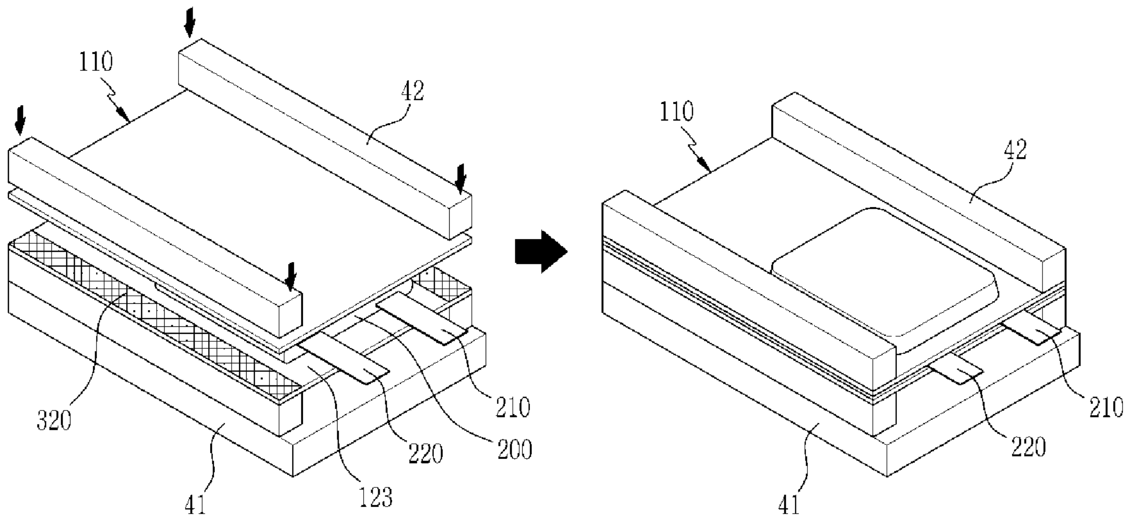

POUCH CASE AND THE METHOD OF MANUFACTURING THE POUCH TYPE SECONDARY BATTERY INCLUDING THE SAME

CROSS-REFERENCE TO RELATED APPLICATIONS

This application is a national phase entry under 35 U.S.C. § 371 of International Application no. PCT/KR2019/015456, filed on Nov. 13, 2019, which claims priority to Korean Patent Application No. 10-2018-0139104, filed on Nov. 13, 2018, the disclosures of which are hereby incorporated herein by reference in their entireties.

TECHNICAL FIELD

The present disclosure relates to a pouch case and a method of manufacturing a pouch type secondary battery including the same.

BACKGROUND ART

With the increase of the technological development and demand for a mobile device, demand for a battery as an energy source rapidly increases, and accordingly, many researches of the battery capable of meeting a variety of needs are emerging.

A secondary battery has attracted considerable attention as an energy source for power-driven devices, such as an electric bicycle, an electric vehicle, and a hybrid electric vehicle, as well as an energy source for mobile devices, such as a mobile phone, a digital camera, and a laptop computer.

A small-sized battery pack, in which a battery cell is mounted, is used for small-sized devices, such as a mobile phone and a digital camera, whereas a middle or large-sized battery pack, in which a battery pack including two or more battery cells connected to each other in parallel and/or in series is mounted, is used for middle or large-sized devices, such as a laptop computer and an electric vehicle.

In view of a battery shape, a prismatic type secondary battery and a pouch type secondary battery that can be applied to products such as a mobile phone with a thin thickness shows high demand. In the case of the prismatic type lithium secondary battery, it is advantageous in protecting an electrode assembly from external impact and the injection process is easy, but the shape is fixed, which make it difficult to reduce the volume. On the other hand, the pouch type lithium secondary battery has advantages in that it is suitable for manufacturing a thin cell due to no restriction on its shape and size, it is easy to assemble the pouch type lithium secondary battery through thermal fusing, and it has high stability due to easy vent of gas or liquid under the condition of abnormal behaviors. However, since the pouch type secondary battery uses a thin soft laminated sheet as a case thereof unlike the prismatic type secondary battery, its physical and mechanical strength are weak, especially its sealing reliability is low, and so its safety against external impact and the like may be low

DETAILED DESCRIPTION OF THE INVENTION

Technical Problem

The present disclosure has been made to solve the above problems, and it is therefore an object to provide a pouch case capable of improving a bonding force of a sealing part so as to increase sealing reliability, and a method of manufacturing a pouch type secondary battery including the same.

However, the problem to be solved by the embodiments of the present disclosure is not limited to the above-described problems, and can be variously expanded within the scope of the technical idea included in the present disclosure.

Technical Solution

A pouch case according to an exemplary embodiment of the present disclosure includes an upper case and a lower case, wherein edge parts of the upper case and the lower case each includes a substrate layer, a metal layer and a sealing layer that are sequentially stacked, and wherein at least one sealing layer of the upper case and the lower case includes a plurality of grooves that are recessed from one surface of the sealing layer.

The depth of the groove may be 6% to 34% of the thickness of the sealing layer.

The width of the groove may be 0.1 mm to 1.0 mm.

The grooves may be formed in a lattice shape.

The interval of the lattice shape may be 0.1 mm to 1.0 mm.

The grooves may be formed in a stripe shape.

The grooves may be formed in an irregular concave-convex shape.

The sealing layer may include a thermoplastic resin.

A method of manufacturing a pouch type secondary battery according to another exemplary embodiment of the present disclosure includes the steps of: accommodating an electrode assembly in a space between an upper case and a lower case, and thermally fusing edge parts of the upper case and the lower case to each other, wherein edge parts of the upper case and the lower case each includes a substrate layer, a metal layer and a sealing layer that are sequentially stacked, and wherein before the step of thermally fusing, the method further includes forming a plurality of grooves on one surface of at least one sealing layer of the upper case and the lower case.

The step of forming the plurality of grooves may include applying pressure to the sealing layer by a first pressing part having a pressing surface on which a protruding shape is formed.

The pressure applied by the first pressing part may be 0.01 MPa to 0.2 MPa.

The step of thermally fusing may include applying heat while applying pressure by the second pressing part having a flat pressing surface.

The depth of the groove may be 6% to 34% of the thickness of the sealing layer.

The width of the groove may be 0.1 mm to 1.0 mm.

The grooves may be formed in a lattice shape.

The interval of the lattice shape may be 0.1 mm to 1.0 mm.

The grooves may be formed in a stripe shape.

The grooves may be formed in an irregular concave-convex shape.

The sealing layer may include a thermoplastic resin.

Advantageous Effects

According to the embodiments, it is possible to manufacture a pouch type secondary battery having improved sealing adhesion without significantly changing the manufacturing process and without affecting the appearance of the battery, by adding a plurality of grooves onto the sealing layer of the pouch case.

BRIEF DESCRIPTION OF THE DRAWINGS

FIG. 1 is an exploded perspective view illustrating a pouch case and a secondary battery including the same according to an exemplary embodiment of the present disclosure.

FIG. 2 is an enlarged cross-sectional view of parts A and B in FIG. 1.

FIG. 3 is a flowchart illustrating a method of manufacturing a pouch type secondary battery according to an exemplary embodiment of the present disclosure.

FIGS. 4*a* and 4*b* are diagrams illustrating a pressing process by the pressing part.

DETAILED DESCRIPTION OF THE EMBODIMENTS

Hereinafter, various embodiments of the present disclosure will be described in detail with reference to the accompanying drawings so that those skilled in the art can easily implement them. The present disclosure may be modified in various different ways, and is not limited to the embodiments set forth herein.

Parts that are irrelevant to the description will be omitted to clearly describe the present disclosure, and like reference numerals designate like elements throughout the specification.

Further, in the drawings, the size and thickness of each element are arbitrarily illustrated for convenience of description, and the present disclosure is not necessarily limited to those illustrated in the drawings. In the drawings, the thickness of layers, regions, etc. are exaggerated for clarity. In the drawings, for convenience of description, the thicknesses of some layers and regions are exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed on the upper side of the reference portion toward the opposite direction of gravity.

Further, throughout the specification, when a part is referred to as "including" a certain component, it means that it can further include other components, without excluding the other components, unless otherwise stated.

Further, throughout the specification, when referred to as "on a plane", it means when a target portion is viewed from the top, and when referred to as "on a cross-section" means when a target portion is viewed from the side of a cross section cut vertically.

FIG. 1 is an exploded perspective view illustrating a pouch case and a secondary battery including the same according to an exemplary embodiment of the present disclosure.

As shown in FIG. 1, a pouch type secondary battery has a positive electrode current collector, a separator, and a negative electrode current collector as a basic structure, and includes an electrode assembly 200 provided with a positive electrode tab extending from the positive electrode current collector and a negative electrode tab extending from the negative electrode current collector, and a pouch case 100 for accommodating the electrode assembly 200.

The pouch case 100 includes an upper case 110 and a lower case 120. In FIG. 1, the upper case 110 and the lower case 120 are illustrated as being separated and formed from each other, but the upper case 110 and the lower case 120 may be connected and integrally formed. The shape of the pouch case 100 is not limited to that illustrated in FIG. 1, and any shape may be used as long as it is a shape that can accommodate and seal the electrode assembly 200. The upper case 110 and the lower case 120 in FIG. 1 each includes an accommodating part having a recessed concave shape. The electrode assembly 200 and the electrolyte may be accommodated in the accommodating part.

The electrode assembly 200 may be configured in a form in which a positive electrode plate and a negative electrode plate are disposed with a separator being interposed between them. At this time, the electrode assembly 200 may have a structure in which one positive electrode plate and one negative electrode plate are wound with a separator being interposed between them, or a structure in which a plurality of positive electrode plates and a plurality of negative electrode plates may be stacked with a separator being interposed between them. The positive electrode plate and the negative electrode plate may be respectively formed as a structure in which an active material slurry is coated onto the electrode current collector. The slurry may typically be formed by stirring an active material, a conductive material, a binder, a plasticizer, and the like in the presence of a solvent.

The electrode assembly 200 may have a noncoated part where the slurry is not coated onto the electrode plate, and electrode tabs corresponding to the respective electrode plates may be formed in the noncoated part. At this time, for electrical connection with external terminals or devices, a part of a positive electrode lead 210 extending from the positive electrode tab and a negative electrode lead 220 extending from the negative electrode tab may have a form exposed to the outside. In this regard, an adhesive film may be further used for attaching or bonding to the pouch case 100 of the electrode lead in accordance with the exemplary embodiment.

FIG. 2 is an enlarged cross-sectional view of parts A and B in FIG. 1.

Referring to FIGS. 1 and 2, the upper case 110 and the lower case 120 constituting the pouch case according to an exemplary embodiment of the present disclosure include sealing parts 110*a* and 120*a* formed at edge parts of the pouch case 100 surrounding the accommodating part in which the electrode assembly 200 of FIG. 1 is accommodated. The sealing parts 110*a* and 120*a* are formed along the edge parts of the pouch case 100, and all or part of the sealing parts 110*a* and 120*a* may be a bonding area to which the upper case 110 and the lower case 120 are bonded. The upper case 110 and the lower case 120 may be thermally fused to seal a pouch case 100.

Looking at the cross-sectional structure of the pouch case 100 located in the bonding area, each of the upper case 110 and the lower case 120 includes substrate layers 111 and 121, metal layers 112 and 122, and sealing layers 113 and 123. The stacking direction of the first substrate layer 111, the first metal layer 112, and the first sealing layer 113 included in the upper case 110 and the stacking direction of the second substrate layer 121, the second metal layer 122 and the second sealing layer 123 included in the lower case 120 are opposite to each other. Specifically, as shown in FIG. 2, the upper case 110 includes a first substrate layer 111, a first metal layer 112, and a first sealing layer 113 that are sequentially located toward the inside from the outside of the upper case 110. The lower case 120 includes a second substrate layer 121, a second metal layer 122, and a second sealing layer 123 that are sequential located toward the inside from the outside of the lower case 120. At this time, the first sealing layer 113 and the second sealing layer 123 are in contact with each other and thermally fused to form a sealed structure.

An adhesive layer (not shown) may also be located between the first substrate layer 111 and the first metal layer 112, between the first metal layer 112 and the first sealing layer 113, between the second substrate layer 121 and the second metal layer 122 and between the second metal layer 122 and the second sealing layer 123, respectively.

The first substrate layer 111 and the second substrate layer 121 may be made of an insulating material such as polyethylene terephthalate (PET) resin or nylon resin in order to secure insulation and formability between the secondary battery and the outside.

The first metal layer 112 and the second metal layer 122 may include any one selected from the group consisting of copper, aluminum, nickel, iron, carbon, chromium, manganese, and alloys thereof.

The first sealing layer 113 and the second sealing layer 123 according to the present embodiment may include a thermoplastic resin. The thermoplastic resin may include polypropylene (PP).

The first sealing layer 113 and the second sealing layer 123 include a plurality of grooves 310 and 320 that are recessed from one surface of the first sealing layer 113 and the second sealing layer 123. That is, a plurality of grooves 310 and 320 respectively recessed in the direction toward the first metal layer 112 and the second metal layer 122 are formed from one surface of the first sealing layer 113 and the second sealing layer 123 which are surfaces where the upper case 110 and the lower case 120 face each other.

The shape of the plurality of grooves 310 and 320 is not particularly limited. For example, it may be formed in a shape in which the grooves 310 and 320 are arranged in a lattice shape, a stripe shape, or an irregular shape. Among them, it may be formed in a lattice shape from the viewpoint of ease of processing, etc., but it is not particularly limited. At this time, intersecting lines of the lattice shape may be formed at an angle of 20 to 70 degrees, preferably 30 to 50 degrees, more preferably 45 degrees with respect to the outer periphery of the pouch case 100, and this is also not particularly limited. In addition, the interval between the lattice-shaped intersecting lines can be appropriately adjusted according to the depth and thickness of the grooves 310 and 320 to be described later, and preferably, it may be 0.1 mm to 1.0 mm.

The plurality of grooves 310 and 320 may have a depth d of 6% to 34% with respect to the thickness of the sealing layers 113 and 123. Preferably, the depth d of the grooves 310 and 320 may be 10% to 30% and more preferably 20% to 30% of the thickness of the sealing layers 113 and 123.

If the depth d is less than 6%, the sealing adhesion is not sufficiently improved, and if the depth is more than 34%, not only does it cause damage to the metal layers 112 and 122, but also the sealing thickness becomes thin and rather, the adhesive force of the sealing layers 113 and 123 can be reduced, which is not preferable.

In addition, the plurality of grooves 310 and 320 may have a width w of about 0.1 mm to about 1.0 mm. If the width w is less than 0.1 mm, the sealing adhesion is not sufficiently improved and the workability is not good. If the width is 1.0 mm or more, it may cause damage to the metal layers 112 and 122 and it is likely to damage the sealing layers 113 and 123, which is not preferable.

By forming the plurality of grooves 310 and 320 in the sealing layers 113 and 123 as described above, when the upper case 110 and the lower case 120 are thermally fused, the contact surfaces which are in contact with each other are increased, and thus the adhesive force is enhanced, thereby increasing the sealing reliability. In addition, grooves are not formed in all layers forming the upper case 110 and the lower case 120, but the grooves 310 and 320 are formed only in the sealing layers 113 and 123 to be thermally fused, whereby flat sealing parts 110*a* and 120*a* can be obtained without bending in appearance, and thus, it may not affect subsequent folding processes, etc. That is, due to bending or wrinkles remaining in the sealing parts 110*a* and 120*a*, damage to the pouch or the like may occur during folding, or the problem of excessive sealing may occur. As described above, the grooves for improving the sealing adhesion are formed only in the sealing layers 113 and 123 and do not affect the appearance, thereby preventing the occurrence of these problems.

Hereinafter, a method of manufacturing a pouch type secondary battery according to an exemplary embodiment of the present disclosure will be described with reference to FIGS. 3 and 4.

FIG. 3 is a flowchart illustrating a method of manufacturing a pouch type secondary battery according to an exemplary embodiment of the present disclosure. FIGS. 4*a* and 4*b* are diagrams illustrating a pressing process by the pressing part.

First, the lower case 120 of the pouch case 100 and the electrode assembly 200 are disposed on a pressing plate 41 (S10). At this time, a part of a positive electrode lead 210 and a negative electrode lead 220 of the electrode assembly 200 is disposed so as to be exposed to the outside of the lower case 120.

Next, as illustrated in FIG. 4*a*, the sealing part 120*a* of the lower case 120 is pressed using a first pressing part 40 to form a plurality of grooves 320 (S20). That is, pressure is applied to the second sealing layer 123 located on the upper surface of the sealing part 120*a* by using the first pressing part having a pressing surface where a shape protruding from the surface is formed (an enlarged part in FIG. 4*a*), so that the grooves 320 recessed from the upper surface can be formed. At this time, the pressure applied by the first pressing part 40 may be 0.01 MPa to 0.2 MPa, preferably 0.1 MPa. When the pressure applied by the first pressing part 40 is less than 0.01 MPa, grooves having sufficient depth cannot be formed on the surface of the second sealing layer 123. When the pressure is 0.2 MPa or more, the second metal layer 122 located below the second sealing layer 123 may be damaged, which is not preferable.

In addition, although not separately illustrated in the present specification, the grooves 310 can be formed even in the upper case 110 through the same process. That is, grooves may be formed on at least one side of the upper case 110 and the lower case 120. Moreover, the grooves 310 and 320 of the upper case 110 and the lower case 120 may be formed only on a pair of sides where the electrode leads 210 and 220 are not formed, as shown in FIG. 4*a*, and the grooves may also be formed on all sides of the pouch case 100 including the part where the electrode leads 210 and 220 are formed as shown in FIG. 1, without being particularly limited.

Next, as shown in FIG. 4*b*, the upper case 110 is disposed so as to cover the lower case 120 and the electrode assembly

200, and heat is applied while applying pressure by the second pressing part 42 having a flat pressing surface to thereby thermally fuse the first and second sealing layers 113 and 123 (S30). That is, by applying heat and pressure, the first and second sealing layers 113 and 123 including the thermoplastic resin are thermally fused to form one integrated sealing layer (not shown). Thereby, the sealed structure of the pouch case is formed to fabricate a pouch type secondary battery.

As described above, before the thermal fusing process of the sealing layers 113 and 123, the grooves 310 and 320 are formed on the upper surfaces of the sealing layers 113 and 123 by adding a pressing process by the first pressing part 40, and then the thermal fusing process is performed by the second pressing part 42, whereby during the thermal fusing process, contact area between the first and second sealing layers 113 and 123 is increased, so that a sealed structure having enhanced adhesion can be obtained. Further, even if the grooves 310 and 320 are formed in this way, since only the pressing step by the first pressing part 40 is simply added, existing equipment can be used to improve the sealing performance. Further, the grooves 310 and 320 are formed only in the sealing layers 113 and 123 by the first pressing part 40, and the sealing adhesion can be enhanced without damaging the metal layers 112 and 122 and the substrate layers 111 and 121 of the pouch case 100.

On the other hand, in the following, the pouch case according to the present disclosure will be described in detail by way of specific examples and comparative examples.

Example 1: 10% Depth of Groove

For each of the first and second sealing layers containing polypropylene (PP), samples each having thicknesses set to 30 μm, 35 μm and 40 μm were prepared.

A pressure of 0.01 MPa to 0.2 MPa was applied to each of the first and second sealing layers by the first pressing part of the present disclosure to form a plurality of grooves having a depth of 10% relative to the thickness of the first and second sealing layers.

Next, heat and pressure were applied by using the second pressing part of the present disclosure, and the first and second sealing layers were thermally fused at a sealing temperature of 160° C. to manufacture a pouch case.

Example 2: 20% Depth of Groove

A pouch case was manufactured in the same manner as in Example 1, except that a plurality of grooves having a depth of 20% relative to the thickness of the first and second sealing layers were formed in each of the first and second sealing layers having thicknesses of 30 μm, 35 μm, and 40 μm.

Example 3: 30% Depth of Groove

A pouch case was manufactured in the same manner as in Example 1, except that a plurality of grooves having a depth of 30% relative to the thickness of the first and second sealing layers were formed in each of the first and second sealing layers having thicknesses of 30 μm, 35 μm, and 40 μm.

Comparative Example 1: No Grooves Formed

A pouch case was manufactured in the same manner as in Example 1, except that no grooves were formed in each of the first and second sealing layers having thicknesses of 30 μm, 35 μm, and 40 μm.

Comparative Example 2: 40% Depth of Grooves

A pouch case was manufactured in the same manner as in Example 1, except that a plurality of grooves having a depth of 40% relative to the thickness of the first and second sealing layers were formed in each of the first and second sealing layers having thicknesses of 30 μm, 35 μm, and 40 μm.

Experimental Example

For the pouch cases of Examples 1 to 3 and Comparative Examples 1 and 2, an adhesion test was performed for each sample. Specifically, each sample was cut to a width of 15 mm using a UTM (Universal Testing Machine) equipment, and then both ends were pulled to measure the adhesive force (kg/mm). Ten samples were measured for each thickness, and the average, minimum and maximum values of the measured adhesive forces (kg/mm) are shown in Table 1 below.

TABLE 1

| | Example 1 | Example 2 | Example 3 | Comparative Example 1 | Comparative Example 2 |
|---|---|---|---|---|---|
| Average value (kg/mm) | 4.74 | 5.15 | 6.04 | 4.60 | 3.62 |
| Minimum value (kg/mm) | 4.3 | 3.94 | 5.02 | 3.39 | 3.13 |
| Maximum value (kg/mm) | 5.21 | 6.74 | 7.84 | 6.48 | 3.96 |

Next, based on the average value of Table 1, the degree of increase in the adhesion force of Examples 1, 2, 3 and Comparative Example 2 compared to Comparative Example 1 in which no grooves were formed is shown in Table 2 below.

TABLE 2

| Comparative Example 1 | Example 1 | Example 2 | Example 3 | Comparative Example 2 |
|---|---|---|---|---|
| 100% | 103% | 112% | 131% | 79% |

Referring to Table 1 and Table 2, when forming grooves having a depth of 6% to 34% relative to the thickness of the sealing layer as in Examples 1 to 3, it can be confirmed that contact surface between the sealing layers was increased compared to Comparative Example 1 in which the grooves were not formed, thereby enhancing the adhesive force. In particular, in Examples 1 to 3, the adhesive force of the sealing layer was increased by 3%, 12% and 31%, respectively, compared to Comparative Example 1.

On the other hand, when the grooves were formed in a thickness of 40%, exceeding 34% of the groove depth relative to the thickness of the sealing layer as in Comparative Example 2, it can be confirmed that the sealing thickness was thinner, and rather, the adhesive force between the sealing layers was reduced. In particular, the adhesive force was reduced by 21% as compared with Comparative Example 1 in which no grooves were formed.

Although the preferred embodiments of the present disclosure have been described in detail above, the scope of the present disclosure is not limited thereto, and various modifications and improvements of those skilled in the art using the basic concepts of the present disclosure defined in the following claims also belong to the scope of rights.

DESCRIPTION OF REFERENCE NUMERALS AND SYMBOLS

100: pouch case
110: upper case
120: lower case
113: first sealing layer
123: second sealing layer
310, 320: grooves

The invention claimed is:

1. A pouch type secondary battery comprising:

an electrode assembly having electrode leads extending therefrom; and a pouch case accommodating an electrode assembly therein in a space between an upper case and a lower case of the pouch case, the electrode leads extending between sealing parts of the upper case and the lower case to an outside of the pouch case, wherein at least one of the upper case or the lower case has an accommodating part having a recessed concave shape in which the electrode assembly is received therein, the upper case and the lower case each having edge parts located outside of an outer periphery of the recessed concave shape and surrounding the accommodating part, wherein the edge parts of the upper case and the lower case each include a substrate layer, a metal layer and a sealing layer that are sequentially stacked, wherein the sealing layer of at least one of the upper case and the lower case includes a plurality of grooves that are recessed from one surface of the sealing layer within the edge parts, wherein the plurality of grooves of the upper case and the lower case are located only in the sealing layers and not in the substrate layers or the metal layers, wherein a width of each of the grooves between adjacent peaks thereof is 0.1 mm to 1.0 mm, wherein the sealing layer of each of the upper case and the lower case includes a thermoplastic resin, wherein a depth of each of the grooves is 6% to 34% of a thickness of the respective sealing layer into which the grooves are recessed, and wherein the depth of each of the grooves is less than 14 μm.

2. The pouch type secondary battery of claim 1, wherein the grooves of each of the upper case and the lower case are formed in a respective lattice shape.

3. The pouch type secondary battery of claim 2, wherein an interval between adjacent grooves of the lattice shape is 0.1 mm to 1.0 mm.

4. The pouch type secondary battery of claim 1, wherein the grooves of each of the upper case and the lower case are formed in a respective stripe shape.

5. The pouch type secondary battery of claim 1, wherein the grooves of each of the upper case and the lower case are formed in a respective irregular concave-convex shape.

* * * * *